June 20, 1944.　　A. O. BECKMAN　　2,351,580
METHOD AND APPARATUS FOR PROPORTIONING
Filed Nov. 22, 1941　　2 Sheets-Sheet 1
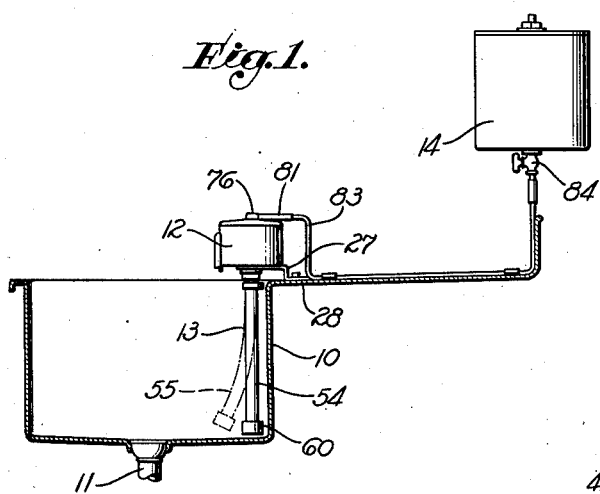
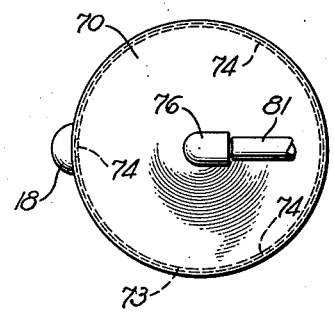
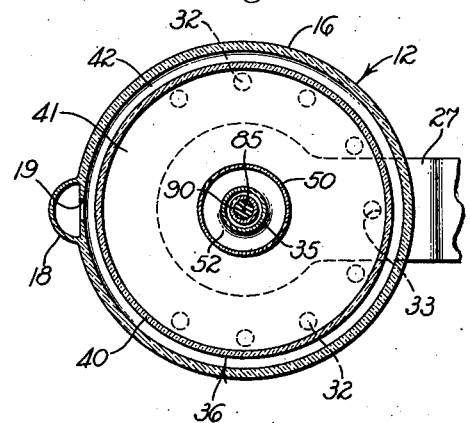
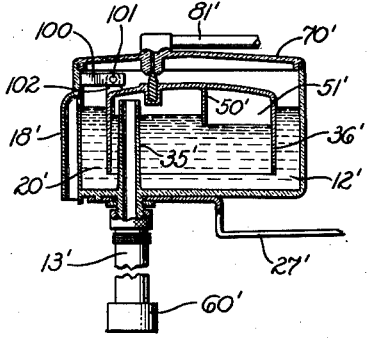
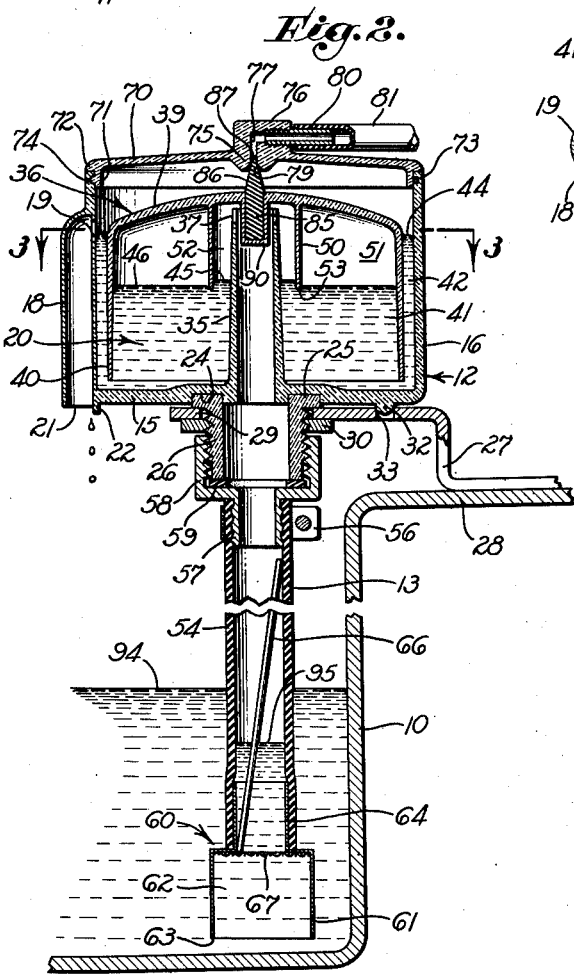
INVENTOR
ARNOLD O. BECKMAN
BY
HARRIS, KIECH, FOSTER & HARRIS
FOR THE FIRM
ATTORNEYS

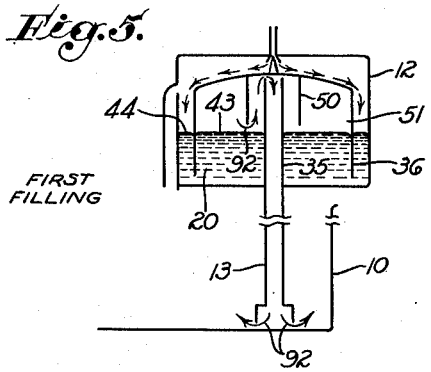
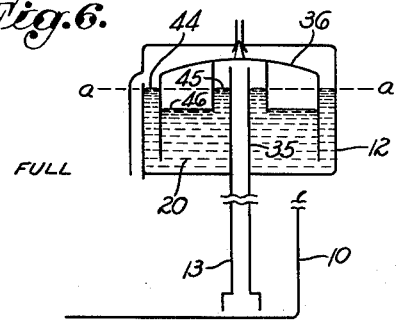
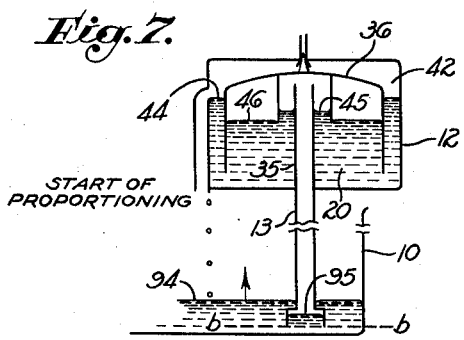
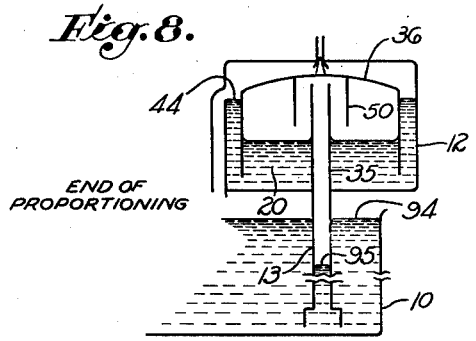
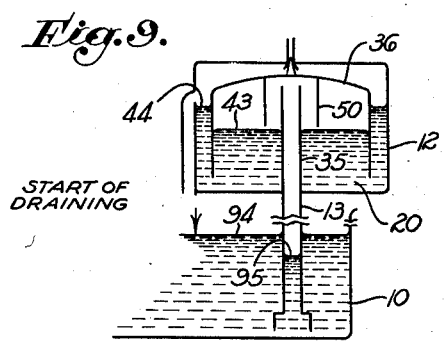
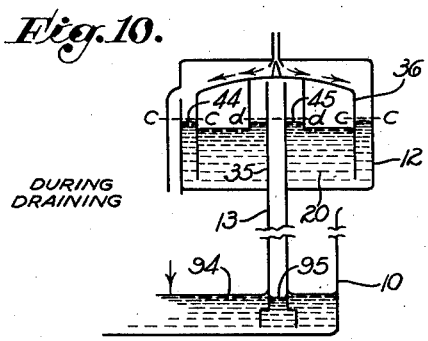
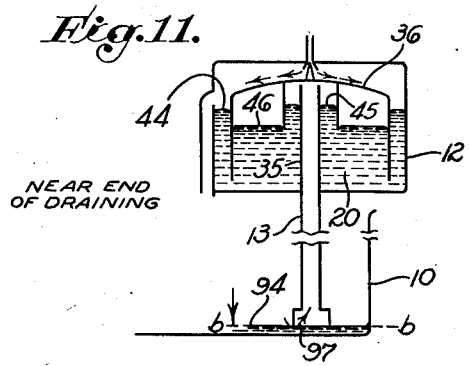

Patented June 20, 1944

2,351,580

UNITED STATES PATENT OFFICE 2,351,580

METHOD AND APPARATUS FOR PROPORTIONING

Arnold O. Beckman, Altadena, Calif., assignor to National Technical Laboratories, South Pasadena, Calif., a corporation of California Application November 22, 1941, Serial No. 420,139

26 Claims. (Cl. 137—68)

My invention relates to a novel method and apparatus for proportioning and, more particularly, to an automatic system for proportioning a solution into a receptacle as the liquid level therein rises, the term "solution" being used in its broadest sense to differentiate from the liquid in the receptacle and without limitation to chemical solutions as the liquid to be proportioned may comprise a pure chemical substance or compound.

The invention will be exemplified with regard to the automatic proportioning of a germicide solution into a sink to form a germicidal rinse. In this connection, numerous local and state regulations now require eating establishments to rinse eating utensils, dishes, glassware, etc., in a disinfecting solution prior to drying thereof. The present invention contemplates a novel apparatus for forming such a disinfecting solution or for automatically proportioning various solutions into a receptacle as water or other liquid is placed therein.

One of the objects of the present invention is to provide a novel proportioning apparatus which operates independently of the liquid supply system in the sense that the device can be independent of any piping which supplies liquid to the receptacle, and will automatically proportion a solution thereinto whether the liquid is moved into the receptacle from a faucet or other orifice, or whether the liquid is merely poured into the receptacle.

It is another object of the invention to dispose a body of solution in a container and to dispense an amount of solution from the container into the receptacle, which amount is substantially proportional to the amount of liquid added to the receptacle.

Another object of the invention is to displace solution from the container into the receptacle under the action of a column of fluid entrapped in an immersion tube extending into the receptacle.

It is desirable that the lower end of such an immersion tube be slightly above the bottom of the receptacle. As the liquid level rises in the receptacle, it entraps a body of air in the immersion tube and establishes an auxiliary liquid surface within the immersion tube which rises with increased amount of liquid within the receptacle. During that period required for the liquid level in the receptacle to rise to the open lower end of the immersion tube, and sometimes for an additional period of time involved in displacing the solution in the container to an overflow position, there will be no proportioning of the solution into the receptacle. It is an object of the present invention, in its more exacting installations, to compensate for such factors to such an extent that a greater-than-normal portion of the solution is dispensed during the earlier part of the proportioning operation. Typically, this compensation is completed by the time the level of the liquid in the receptacle is at a depth of an inch or two, after which the device will dispense solution into the receptacle in relatively strict proportion to the increase in amount of liquid supplied thereto.

It is an object of the present invention to provide a relatively small container retaining a body of the solution and to replenish this solution in a novel manner between proportioning operations, while preventing any supply of additional solution to the container during the proportioning operation.

Another object of the invention is to provide a proportioning device which is extremely simple and which involves only one moving element. At the same time, it is an object of the invention to provide a proportioning apparatus which can be made to be extremely accurate, yet which is adaptable for easy attachment to existing receptacles and which is entirely automatic in operation.

Further objects of the invention lie in the provision of a novel float-like structure in the nature of an inverted cup, in the provision of a novel valve means associated therewith, in the provision of a novel mounting means for the container, and in the provision of a novel form of immersion tube. It is a further object of the invention to provide a proportioning device which can be made substantially entirely of non-metallic materials to be resistant to the action of chemical solutions and, in addition, to provide a construction which can be formed almost entirely of plastic or synthetic materials.

Further objects and advantages of the invention will be made evident to those skilled in the art from the description of the preferred embodiment of the invention which follows.

Referring to the drawings:

Figure 1 is a utility view showing the invention installed for proportioning a germicide solution into a sink;

Figure 2 is an enlarged sectional view of the proportioning apparatus with the liquid levels shown at a position during the proportioning operation;

Figure 3 is a horizontal sectional view, taken on the line 3—3 of Figure 2;

Figure 4 is a top view of the apparatus;

Figures 5 to 11, inclusive, are diagrammatic views showing the liquid levels at different positions during filling of the container, proportioning into the receptacle, and draining of the receptacle; and Figure 12 is a vertical sectional view of an alternative embodiment of the invention.

Referring particularly to Figure 1, the numeral 10 indicates the receptacle, in this instance a sink, provided with a drain 11 which can be closed by any suitable valve or plug means, not shown. Water is introduced into this receptacle from any suitable source, not shown.

In general, the proportioning apparatus includes a container 12 retaining a body of the solution, and an immersion tube 13 which, with the elements within the container 12, controls the proportioning of solution into the receptacle 10 as the liquid level therein rises. In addition, it is usually desirable to provide a source 14 of additional solution to renew the body of solution in the container 12 between periods of proportioning.

Referring particularly to Figure 2, the container 12 includes a bottom wall 15 and a cylindrical side wall 16, preferably molded of plastic material resistant to corrosion by the solution to be dispensed. Formed integrally with the container and positioned on one side thereof is a discharge spout 18 communicating with the interior of the container through an overflow means 19, which may comprise an opening in the side wall 16. A body of solution, indicated generally by the numeral 20, is retained in the container and, during proportioning, is displaced in such manner as to discharge solution in proportioned amounts over the overflow means 19, downward in the discharge spout 18 to flow or drop into the receptacle 10. It is preferable to provide the discharge spout 18 with a lower wall 21 slightly below the bottom of the wall 15 and to provide a drip member 22 which extends down even farther to insure that the solution will drop directly downward into the receptacle rather than flowing inward along the under surface of the bottom wall 15.

The bottom wall 15 provides an annular depression 24 in which is cemented a flange 25 carrying an externally-threaded neck 26. It will be understood, however, that the neck 26 can be molded integrally with the container 12, if desired, without departing from the spirit of the invention.

Adapted to mount the container 12 above the receptacle 10 is a bracket 27, which may be suitably secured to a shelf 28 forming a part of, or positioned adjacent, the receptacle 10. This bracket 27 provides an opening 29 of sufficient size to receive the neck 26 and a nut 30 is threaded thereon to clamp the bracket against the flange 25 and retain the container 12 and the immersion tube 13 in the position shown in Figure 1. It will be noted that the height of the flange 25 is slightly greater than the depth of the corresponding depression 24 so that there is no clamping action between the nut 30 and the bottom wall 15 tending to remove this flange from its corresponding depression against the action of the adhesive material.

It is desirable to provide for mounting the container 12 in an adjustable manner so that the discharge spout 18 can be above a desired portion of the receptacle 10. The adjustment provided by the nut 30 can be used in this capacity, the nut being tightened when the container is in the desired position. However, to supplement this action and insure greater rigidity, I provide for interlocking the container 12 and the bracket 27 at various positions of the former. Thus, the bottom wall 15 provides several members 32 spaced from each other in the circumference of a circle drawn about the axis of the neck 26. The bracket 27 provides an opening 33 of a size to receive one of these members. Correspondingly, before tightening the nut 30, the container is turned until the desired one of the members 32 is in the opening 33, after which this nut is tightened and the container is locked from rotation with respect to the bracket 27.

Extending upward from the bottom wall 15, and preferably molded integrally therewith, is a riser tube 35 which opens on the interior of the neck 26. The upper end of this riser tube extends to a position above the normal surface level of the body of solution 20, this normal surface level being indicated by the level a—a of Figure 6 and being slightly below the overflow means 19. This upper end of the riser tube 35 can be made to serve as a stop limiting the downward movement of an inverted cup 36, to be subsequently described in detail. To insure open communication between the interior and exterior of the riser tube 35 even when the inverted cup 36 is in its lowermost position, I provide one or more openings 37 which may comprise merely saw-cuts in the top of this riser tube.

Disposed in the container 12 is a float-like member which can move up and down in a limited range to perform various functions. This member has been shown as the inverted cup 36 and includes an imperforate top wall 39 and a depending skirt 40. This skirt dips into the body of solution 20 and perferably extends downward to a position close to the bottom wall 15, though spaced therefrom even when the inverted cup 36 is resting on the stop provided by the upper end of the riser tube 35. This inverted cup 36 divides the interior of the container 12 into two chambers. One of these chambers is within the inverted cup and is indicated generally as a main chamber 41. The other of these chambers is outside the inverted cup and is indicated generally as a discharge chamber 42. The skirt 40 correspondingly divides the surface of the body of solution 20 into two portions, one inside the inverted cup, indicated generally by the numeral 43, and the other in the annular discharge chamber 42 around the cup and being indicated by the numeral 44.

In the preferred embodiment of the invention, the surface 43 is further divided, at certain times during the operation of the device, into inner and outer surfaces 45 and 46. This division is accomplished by use of a baffle 50 which divides the upper interior of the inverted cup 36 into a pocket 51 and a compartment 52 into which the upper end of the riser tube 35 extends. The baffle 50 is preferably formed integrally with the inverted cup 36 as a depending cylinder providing a lower edge 53 disposed below the normal surface level, indicated by the level a—a of Figure 6, but above the lower end of the skirt 40.

The device proportions solution into the receptacle 10 by displacement of solution from the main chamber 41 into the discharge chamber 42 in such manner as to raise the surface 44 to an overflow position. While this displacement can be effected by various means without departing from the spirit of the invention, I prefer to use in this capacity a column of gas, typically air, extending between the surface 43 (or its component surface 45) and a surface of the body of water which rises in response to an increase in the amount of water in the receptacle 10. The immersion tube 13 comprises the preferred confinement for such a column of air, as will be more fully described hereinafter.

This immersion tube is of novel construction and is best shown in Figures 1 and 2 as including a tube 54, preferably formed of resilient material, such as rubber. A length of rubber hose of appropriate internal diameter is very satisfactory in this connection and permits swinging of the immersion tube into its dotted line position 55 of Figure 1 to permit cleaning of the adjacent walls of the receptacle. In installations where resiliency permitting bending of the immersion tube is not desired, this tube can be formed of metal or plastic material and retained in fixed position.

The embodiment shown in Figure 2 indicates the upper end of the tube 54 as being retained by clamp 56 around a hose-fitting 57 providing an attachment member 58 internally threaded to be screwed onto the neck 26, a tight seal being insured by the presence of a washer 59.

In the preferred embodiment of the invention, the lower end of the tube 54 carries a bell 60 including a cylindrical side wall 61 providing a chamber 62, the lower end of the bell 60, and correspondingly the lower end of the immersion tube 13 of which it forms a part, being open to the atmosphere within the receptacle 10 when there is no water therein, this lower end being indicated by the numeral 63. The bell 60 provides an upward-extending sleeve 64 which can be forced into the lower end of the tube 54 to retain the bell in position.

The effective internal area of the tube 54, taken in a horizontal plane, should bear a constant ratio to the horizontal cross-sectional area of the receptacle 10 at any particular elevation, for reasons to be later discussed. At the same time, it is desirable that the tube 54 be of standard or readily obtainable size rather than designing and constructing special tubes to be used with a wide variety of installations in which the cross-sectional areas of the receptacle 10 may be quite different. To permit standardization of size of the immersion tube, I prefer to use a tube of somewhat larger internal diameter than required in some installations and to place therein one or more elements, such as rods 66, to occupy a portion of the volume of the excess-diameter tube and bring the effective area to the desired value. Also, such elements may be disposed to terminate at different elevations within the tube to compensate for receptacles in which the side walls are not vertical, the elements being positioned in such manner that the effective cross-sectional area at any elevation bears a substantially constant ratio to the cross-sectional area of the receptacle at this elevation. Alternatively, a tapered rod can be used to perform this function. A single element is shown in Figure 2 and may consist of a flexible rod of rubber, plastic material, or spring metal, in which event the immersion tube can be bent sideward even to such an extent that the rod member be deformed. On the other hand, a rod which is not flexible can often be employed, this sidewise displacement of the immersion tube being permitted by bending above the rod. It will also be apparent that a considerable degree of flexing of the immersion tube can be obtained in the section occupied by the rod due to the fact that this rod is considerably smaller than the tube. As shown in Figure 2, one or more rods may rest on a screen disc 67 supported in the bell 60, or may be otherwise retained at the desired elevation within the tube 13.

The container 12 provides a cover 70, preferably formed of molded plastic material, and providing a depending flange 71 extending downward inside the side wall 16 of the container, and a lip 72 extending over the top of this side wall. An annular channel 73 is cut on the inside of the side wall 16 and three ledges 74 are formed on the flange 71, equally spaced from each other, to extend into the channel 73 to removably retain the cover 70 in position. Removal of the cover can be effected by flexing the side wall 16 sufficient to release one of the ledges 74. The cover 70 need not form a fluid-tight seal with the side wall 16 and the fit is preferably of such character as to provide a vent for the interior of the container 12 as this interior should remain at atmospheric pressure either through communication with the surrounding air by way of this vent or by way of the opening providing the overflow means.

The cover 70 carries a valve seat member 75 and a boss 76, both of these elements being preferably formed integrally with the cover. A small orifice 77 extends therethrough and opens downwardly inside the container, there being a downwardly-diverging wall 79 forming the exit for this passage. A nipple 80 is threaded into the boss 76 and receives a section of rubber tubing 81 which extends horizontally to a bent tube 83 communicating through valve 84 with the source 14. This source may be mounted above the container 12 at any remote position so that solution tends to flow by gravity from the source 14. Alternatively, this source can be at a position below the container 12 and flow thereto obtained by building up or maintaining a pressure in the source 14 or in the tube 83 sufficient to supply solution to the orifice 77 at a pressure slightly above atmospheric pressure.

The valve seat member 75 forms one element of a valve means by which the supply of additional solution to the container 12 is controlled in response to a change in vertical position of the inverted cup 36. While various linkages interconnecting the inverted cup with such a valve means can be employed without departing from the spirit of the invention, I prefer to use the simple expedient of disposing a valve member 85 on the inverted cup to rise therewith into valve-closing position. This valve member is shown as comprising a cylindrical plug formed of soft rubber and providing a tapered portion 86 which converges upwardly to a relatively sharp point 87. If the inverted cup 36 rises while displaced sideward from its position shown in Figure 2, this point engages the diverging wall 79, which guides the point and the upper end of the valve member 85 into the orifice 77 in sealing relationship therewith. As the inverted cup 36 drops slightly, the top of the valve member is withdrawn from the orifice to permit additional solution to flow into the container 12. The lowermost position of the point 87 need not be below the lower boundary of the diverging wall 79, as determined by engagement between the inverted cup and the riser tube 35.

On the other hand, even if the upper end of the valve member 85 is withdrawn below the lower boundary of the diverging wall 79, the invention comprehends a guide means for the inverted cup which will insure entry of the valve member into the orifice 77. This guide means may comprise the side wall 16 but preferably includes a member 90 extending downward from the top wall 39 of the inverted cup within the riser tube 35 with sufficient clearance to permit open communication between the riser tube and the compartment 52. This member 90 also provides a pocket serving to receive the lower end of the valve member 85 which, in this embodiment, is made of such size as to fit snugly in the pocket to be retained without use of auxiliary holding means, though it will be clear that the valve member can be cemented in place, if desired.

The general mode of operation of the device can best be understood by reference to Figures 5 to 11, keeping in mind the considerations involved in the dimensional relationships which will be later discussed. In understanding the operation of the device, it should be kept in mind that there are various forces acting upon the inverted cup 36 to determine its vertical position. Three forces can be effective in tending to move this inverted cup downward. The first force is that due to gravitational effect because of the mass of the cup. The second force is the result of a pressure differential above and below the top wall 39 and may or may not be of importance as it would come into play as a downward force only if a vacuum was present within the inverted cup. The third force is that effective on the valve member 85 due to the pressure of the solution in the orifice 77. In opposition, there are two forces tending to move the inverted cup upward. The first of these forces is a buoyant force and depends upon the liquid levels in the system. The second upward force is due to a pressure differential on opposite sides of the top wall 39 and is effective as an upward force if the pressure inside the inverted cup is at superatmospheric value.

When the device is first installed, with no solution in the container 12 or in the receptacle 10, the inverted cup will be in its lowermost position and the valve means 75, 85 will be open. The valve 84 is now opened and solution will flow from the source into the container, conditions being as shown in Figure 5. The solution entering the container will flow downward over the top of the inverted cup, tending to raise the surface 44. The surface 43 will be raised correspondingly as the upper end of the inverted cup is at this time vented to the atmosphere through the immersion tube 13. An upward rise of the surface 43 will displace air, as indicated by the arrows 92.

As soon as this surface 43 rises to the lower edge 53 of the baffle 50, it cannot rise further in the pocket 51 except incidentally through compression of the body of air which is entrapped therein. Correspondingly, the surface 43 is divided into its component surfaces 45 and 46, the latter remaining substantially at the position shown in Figure 6 and the former continuing to rise with the surface 44 to the level a—a, representing the normal surface level in the container 12. As the surfaces 44 and 45 near this normal position, it will be clear that the buoyancy of the inverted cup will increase and, when the buoyant force is greater than the gravitational force, the inverted cup will rise into the valve-closing position shown in Figure 6 and the normal surface level will be established. The device is now ready for a proportioning operation.

Referring particularly to Figure 7, it will be apparent that the first increment of water introduced into the receptacle 10 will produce no change in the proportioning apparatus until the level of this water reaches level b—b, which corresponds to the open lower end 63 of the immersion tube. At this instant, the surface of this water will be divided into two component surfaces, hereinafter referred to as a water-surface or level 94, outside the immersion tube, and an auxiliary surface or level 95, within the immersion tube. Also at this instant, the vent for the upper end of the inverted cup and provided by the immersion tube 13 will be closed off and a body of air, at this instant at atmospheric pressure, will be entrapped in the immersion tube and in the upper end of the inverted cup 36. As additional water is supplied to the receptacle 10, the surface 94 rises to a position shown in Figure 7. The auxiliary surface 95 will not rise an equal distance because, before this surface can rise, it must compress the column of air entrapped in the immersion tube. However, the auxiliary surface 95 will rise as some function of the surface 94.

Because of the design considerations to be hereinafter referred to, it is desirable that the device start to proportion before the auxiliary level 95 reaches the top of the bell 60. Figure 7 shows approximately the position of the levels throughout the system at the instant proportioning starts. It will be apparent that the superatmospheric pressure built up in the immersion tube in response to an increase in the amount of water in the receptacle will depress the surface 45 and displace solution from the interior of the inverted cup into the discharge chamber 42 to raise the surface 44 to an overflow position. At this time, the differential level between the surfaces 44 and 45 will be substantially equal to the differential level between the surfaces 94 and 95.

As additional water is added to the receptacle, the levels will assume the position shown in Figure 2, the differential levels in the container (and, correspondingly, the pressure in the inverted cup) increasing with the differential levels inside and outside the immersion tube (and, correspondingly, the pressure within the immersion tube), the surface 44 remaining unchanged at the overflow position. It will be understood that the superatmospheric pressure which is developed inside the inverted cup 36 in response to a rise in the water surface 94 will act not only to displace solution from the overflow means 19 but also to increase the buoyant action on the float (by raising the surface 44 above the normal level a—a) and to create a pressure differential above and below the top wall 39, these actions tending to increase the pressural engagement of the valve elements to insure an even tighter seal between the valve member 85 and the seat member 75. It is important to the invention that no additional solution be supplied to the container 12 during proportioning periods, and the arrangement of parts is such as to preclude such entry during proportioning, while permitting renewal of the solution in the container between proportioning periods.

If the receptacle 10 is filled to a level higher than that indicated in Figure 2, the surface 45 may be displaced below the lower edge 53 of the baffle 50, as shown in Figure 8. The device is so arranged as to discharge an amount of solution from the container 12 which is substantially proportional to an increase in the amount of water in the receptacle 10 so that correct proportioning is obtained irrespective of the amount of water, above a predetermined minimum as hereinafter described, which is introduced into the receptacle.

During drainage of the receptacle, conditions will be as shown in Figures 9, 10, and 11. Figure 9 shows these conditions shortly after the start of the draining operation. It will be clear that, as the surface 94 moves downward, the compressed air in the immersion tube can expand, thus tending to decrease the differential level between the surfaces 94 and 95. At the same time, the differential levels between the surfaces 44 and 43 will decrease until the surface 43 rises to the lower edge 53 of the baffle 50, after which further drainage of liquid from the receptacle will decrease the differential level between the surfaces 44 and 45. During this draining operation, it will be apparent that the buoyancy of the inverted cup 36 is decreasing due to the lowering of the surface 44, and the internal pressure is approaching atmospheric value.

When these upward forces are less than the gravitational force tending to move the inverted cup downward, this cup will drop slightly to open the valves 75, 85 and permit additional solution to flow into the container, as suggested in Figure 10. If the orifice 77 can supply solution in excess of the rate at which water is being withdrawn from the lower end of the immersion tube, the inverted cup may again rise to close the valve means until the buoyant forces again are less than the gravitational force, at which time the valve means may open. Correspondingly, under such conditions, the valve means may open and close intermittently during the latter part of drainage of water from the receptacle. In understanding this change in buoyancy, it will be clear from Figure 10 that, as soon as additional solution is supplied to the container, the levels 44 and 45 are raised slightly to their respective elevations indicated by the levels c—c and d—d, at which time the buoyant action may again be sufficient to close the valve means until the levels 44 and 45 drop again to their positions shown in Figure 10.

On the other hand, if the orifice 77 cannot supply solution to the container 12 at a rate greater than the rate of withdrawal of water from the lower end of the immersion tube, there may be a slight vacuum created within the inverted cup, which vacuum condition may exist during the latter part of drainage of water from the receptacle until the surface 94 reaches the level b—b, at which time air will surge into the immersion tube, as indicated by the numeral 97, to bring the levels 44 and 45 to the normal surface level within the container, as indicated by level a—a in Figure 6. It will be apparent that, if the levels 44 and 45 are not at this normal position at the instant shown in Figure 11, they will attain this position during drainage of the remainder of the water from the receptacle and, in any event, before additional water is added thereto for a refilling operation.

Correspondingly, the device renews the body of solution in the container 12 during drainage of the receptacle, i. e., between proportioning operations, so that each proportioning operation starts when a predetermined amount of solution is in the container 12.

The following considerations should be kept in mind in the design of the system. The rate of overflow of the solution from the container into the receptacle will depend upon the rate of displacement thereof once the surface 44 is at overflow position. The volume of solution which is displaced to flow into the receptacle will be substantially proportional to the volume displaced by a rise in the auxiliary surface 95 between two positions. When the auxiliary surface 95 is above the bell 60, a unit rise in this surface will displace from the tube and into the inverted cup a corresponding volume of air which, in turn, will displace a corresponding volume of solution from the container into the receptacle. Knowing the concentration of the solution dispensed and the desired strength of the dilute solution in the receptacle, it is possible to secure satisfactory results with an immersion tube having an internal diameter of D in the following equation:

$$D = 0.0113 \sqrt{\frac{AC}{P}}$$

where:
D = internal diameter of the immersion tube (in inches)
A = cross-sectional area of the receptacle 10 (in square inches)
C = concentration or strength desired in the receptacle (in parts per million), and
P = concentration of metered solution (in percent).

This formula can well be used to determine the internal diameter of the main section of the immersion tube if, as is presupposed in the formula, the receptacle is of same area in horizontal cross section at different elevations. If not, the diameter of the immersion tube should be correlated with the receptacle diameter at each elevation to maintain proportionality therebetween.

An immersion tube without a bell 60 can often be used to give entirely satisfactory results and proportion within an accuracy of ±1% or better, particularly if the open lower end of the immersion tube is within a fraction of an inch from the bottom of the receptacle. In the proportioning of germicide solution into a sink, it is often possible to dispense with the bell and secure sufficiently accurate proportioning by having the lower end of the immersion tube about ⅛ inch above the bottom of the sink. This is particularly true as the operator usually fills the sink with about the same amount of water for each rinse and, if this is the case, the device can be made to proportion very accurately at or near this water level.

It will be clear, however, that no solution is proportioned during rise of the surface 94 to the level b—b, representing the lower end of the immersion tube, and no solution is proportioned during that additional small rise in the surface 94 required to move the surface 44 from its normal level shown in Figure 6 to its overflow position shown in Figure 7. While this difference in elevation of the surface 44 can be made small, it is still desirable that it be in the neighborhood of ⅛ to ⅜ inch to avoid splashing of solution from the container into the receptacle by vibration.

In the more exacting installations, the bell 60 can be employed to effect compensation according to the following:

Remembering that the volume of solution displaced is substantially proportional to the volume of air displaced by a rise in the auxiliary surface 95 between two points, the use of an enlarged chamber formed by the bell 60 can increase the rate of proportioning during that period from the instant that proportioning first starts (Figure 7) to that instant at which the surface 95 reaches the top of the bell 60. This involves a proper design of the volume of the space inside the bell 60 which volume, in turn, can be changed by changing the diameter of the bell or the height of the side wall 61 thereof. The internal volume of the bell should be sufficient to compensate for two factors. In the first place, the excess volume provided by the bell should be equal to that volume of the discharge chamber 42 which must be filled to raise the surface 44 from its position shown in Figure 6 to its overflow position shown in Figure 7. In the second place, this excess volume should, in addition, compensate for the absence of entrapment when the water surface 94 is below the level b—b at the bottom of the inverted bell, and this will depend upon the distance between the bell and the bottom of the receptacle, as well as upon the horizontal area of the receptacle, e. g., the volume of water which can be put into the receptacle before air is entrapped in the immersion tube.

By proper design of the bell, according to the teachings noted above, proportioning can be made to start when the auxiliary surface 95 is below the top of the bell, as shown in Figure 7, and the rate of proportioning during the time that it takes this auxiliary surface to rise to the top of the bell will be increased above the rate of proportioning which will exist during the remainder of the receptacle-filling operation. In other words, by the time that the surface 94 is at a level to move the auxiliary surface 95 to the top of the bell, and at all higher elevations of the surface 94, the proportioning will be correct and the concentration of the resulting rinse solution will be constant. In practice, I find it quite easy to insure that this correct proportioning will take place when the surface 94 is more than 1½ inches above the bottom of the receptacle, using a bell which has an internal diameter substantially twice that of the effective area of the tube 54, and when the side wall of the bell is of a height of about 1 inch, the lower open end being spaced about ⅛ inch above the bottom of the container. These figures are approximate and, by careful design, exact proportioning can be insured when more than 1 inch of water is in the receptacle, particularly as the height of the bell can be made considerably less than the one inch figure exemplified above. Any control which insures proportioning at depths greater than 1½ to 2 inches will ordinarily be quite satisfactory for the disinfecting of eating utensils as a rinse solution of at least that depth is necessarily required for the rinsing operation.

An alternative embodiment of the invention is disclosed in Figure 12, which differs from the embodiment shown in Figure 2 primarily in the use of a pivoted inverted cup serving to control the valve means. Corresponding elements are indicated by primed numerals in Figure 12 and need not be particularly described.

In this embodiment, the riser tube 35' does not extend centrally into the inverted cup 36' but, rather, is disposed on that side of the central axis thereof on which the inverted cup is pivoted. This pivoting can take place by means of an arm 100 extending into the container 12 and carrying a pin 101 to which an arm 102 of the inverted cup is pivoted. In this embodiment, the baffle 50' comprises a wall extending across the interior of the inverted cup so that the pocket 51' is at the far side of the inverted cup 36' from the pivot means, thus insuring greater leverage effective in closing the valve means and permitting the supply of solution from the source 14 at greater pressures, while maintaining adequate control thereof through the buoyant and other forces previously mentioned as being effective in raising and lowering the inverted cup.

Certain of the broader aspects of the present invention are explained in my copending application, Serial No. 420,140, filed November 22, 1941, showing additional embodiments.

Various changes and modifications can be made in the devices herein shown without departing from the spirit of the appended claims.

I claim as my invention:

1. An apparatus for proportioning a solution into a liquid in a receptacle as the liquid level therein rises, including in combination: walls defining a main chamber and a discharge chamber completely surrounding said main chamber, said chambers being adapted to contain main and discharge columns of said solution and said columns communicating with each other at a position below the upper surfaces thereof; overflow means associated with said discharge chamber and communicating with said receptacle for discharge of solution into said receptacle as the surface of said discharge column rises to said overflow means; means for displacing solution from said main chamber to said discharge chamber to overflow into said receptacle in amount substantially proportional to the increase in the amount of liquid in said receptacle; and means for bringing said chambers to atmospheric pressure preparatory to said displacing of said solution.

2. An apparatus for proportioning a solution into a liquid in a receptacle as the liquid level therein rises, including in combination: walls defining inner and outer concentric chambers containing columns of said solution, said outer chamber being open to the atmosphere; overflow means communicating with said outer chamber for discharging solution into said receptacle; cover means for said outer chamber; a separate cover means for said inner chamber; and means for increasing the pressure in said inner chamber to a superatmospheric value in response to an increase in the amount of said liquid in said receptacle to displace solution from said inner chamber to said outer chamber to discharge over said overflow means.

3. An apparatus for proportioning a solution into a liquid in a receptacle as the liquid level therein rises, including in combination: a container for retaining a body of said solution and providing an overflow means above the normal surface level of said solution; an inverted cup providing a skirt extending into said solution, said inverted cup providing a chamber into which said solution may rise toward said normal surface level; and means for venting the upper end of said chamber to atmospheric pressure until such time as said liquid in said receptacle rises to a predetermined elevation and for thereafter increasing the pressure in said chamber in response to an increase in the amount of liquid in said receptacle to displace solution from said chamber for discharge into said receptacle over said overflow means.

4. A combination as defined in claim 3, in which said inverted cup is buoyant and in which said cup includes baffle means inside said chamber and providing a pocket communicating at its lower end with said chamber, said lower end being below said normal surface level whereby a rise in the level of said solution in said chamber toward said normal surface level will entrap air in said pocket to increase the buoyancy of said inverted cup.

5. An apparatus for proportioning a solution into a liquid in a receptacle as the liquid level therein rises, including in combination: a container; a movable float providing a skirt cooperating with said container in defining a discharge passage, said float defining a chamber; means for delivering solution to said container preparatory to a proportioning operation to establish columns of solution in said discharge passage and in said chamber; overflow means communicating between said discharge passage and said receptacle; and means for forcing a gas into said chamber of said float in response to an increase in the amount of liquid in said receptacle to displace solution from said chamber into said discharge passage for overflow into said receptacle.

6. An apparatus for proportioning a solution into a liquid in a receptacle as the liquid level therein rises, including in combination: a container for retaining a body of said solution and providing an overflow means above the normal surface level of said solution; a valve seat member; a float in said chamber and buoyed upward by said solution; a valve member operatively connected to said float and positioned to engage said valve seat member upon upward movement of said float; and means for raising the normal surface level of said solution around said float and to said overflow means to discharge solution from said overflow means into said receptacle in response to an increase in the amount of liquid therein and to increase the buoyancy of said float to increase the pressural engagement between said valve member and said seat member.

7. An apparatus for proportioning a solution into a liquid in a receptacle as the liquid level therein rises, including in combination: a container for retaining a body of said solution and providing an overflow means communicating with said receptacle and positioned above the normal surface level of said solution; an inverted cup in said container providing a skirt extending downward in said solution whereby portions of said solution are respectively inside and outside said inverted cup; a valve means communicating with said container for delivery of additional solution thereto; means for operatively connecting said inverted cup to said valve means to close same upon lifting of said cup; and means for displacing solution from the inside of said inverted cup to the outside thereof to flow from said overflow means into said receptacle in response to an increase in the amount of liquid in said receptacle.

8. A combination as defined in claim 7, including a baffle means within said inverted cup and providing a pocket communicating at its lower end with said chamber, the lower end of said baffle means being below the normal surface level of said solution in said chamber whereby a rise in said surface level in said chamber above said lower end of said baffle means will entrap air in said pocket to increase the buoyancy of said inverted cup.

9. An apparatus for proportioning a solution into a liquid in a receptacle as the liquid level therein rises, including in combination: a container for retaining a body of said solution and providing an overflow means communicating with said receptacle; an inverted cup vertically movable in said container; a cover for said container; a valve seat member retained by said cover in a position above said inverted cup; a valve member retained by said inverted cup to rise into engagement with said seat member whereby solution delivered to said container through said seat member will exert a buoyant action on said inverted cup to engage said valve member and said seat member when the surface level of said solution rises to a predetermined position, which position is below said overflow means; and means for displacing solution from said container over said overflow means and into said receptacle in response to an increase in the amount of liquid in said receptacle.

10. A combination as defined in claim 9, in which said seat member provides a small orifice and a downwardly-diverging wall communicating therewith, and in which said valve member comprises an upwardly-converging surface terminating in a relatively sharp point which is guided by contact with said downwardly-diverging wall into said orifice.

11. An apparatus for proportioning a solution into a liquid in a receptacle as the liquid level therein rises, including in combination: a container for retaining a body of said solution and providing an overflow means communicating with said receptacle and positioned above the normal surface level of said solution; an immersion tube extending downward in said receptacle and providing an open lower end above the bottom of said receptacle to be open to the atmosphere in said receptacle when the level of said liquid is below said open lower end whereby a rise in said liquid level entraps air in said immersion tube and establishes an auxiliary surface of said liquid within said tube which rises therein as additional liquid is supplied to said receptacle; means for raising the surface level of said solution in said container above said normal surface level in response to a rise in said auxiliary surface of said liquid in said immersion tube, said rise in said surface level of said solution being sufficient to discharge solution from said overflow means into said receptacle; and a space-occupying but mechanically-inert rod means in said immersion tube to occupy a portion of the space therein and to establish a predetermined ratio between the horizontal cross-sectional area of the remaining space inside said immersion tube and the horizontal cross-sectional area of said receptacle at a corresponding elevation.

12. An apparatus for proportioning a solution into a liquid in a receptacle as the liquid level therein rises, including in combination: a container for retaining a body of solution and providing an overflow means communicating with said receptacle and positioned above the normal surface level of said solution; a buoyant movably-mounted inverted cup providing a skirt extending downward in said body of solution to divide the surface of said body of solution into an inner surface and an outer surface; means for preventing rise of said buoyant inverted cup above a predetermined position in said container; a riser tube extending upward in said container to a position above said normal surface level; and an immersion tube communicating with said riser tube and extending downward from said container into said receptacle, said immersion tube providing an open lower end whereby a rise in the level of said liquid in said receptacle will entrap air in said immersion tube and displace same upward to the interior of said inverted cup to lower said inner surface and raise said outer surface to overflow into said receptacle.

13. A combination as defined in claim 12, in which said means for preventing movement of said inverted cup above a predetermined position includes a valve seat member providing an orifice through which additional solution can be supplied to said container and a valve member operatively connected to said inverted cup to rise therewith into sealing engagement with said orifice to determine the uppermost position of said inverted cup.

14. A combination as defined in claim 12, including a baffle means extending downward inside said inverted cup to a position below the top of said riser tube and cooperating with said skirt in defining a pocket spaced from said riser tube and closed at its upper end to entrap a body of air.

15. An apparatus for proportioning a solution into a liquid in a receptacle as the liquid level therein rises, including in combination: a container for retaining a body of said solution and providing an overflow means communicating with said receptacle and positioned above the normal surface level of said solution; a riser tube extending upward in said container to a position above said normal surface level; a buoyant inverted cup vertically movable in said container and providing a skirt extending downward in said solution; a baffle means extending downward in said inverted cup to a position below the top of said riser tube but above the bottom of said skirt and dividing the upper interior of said inverted cup into a compartment communicating with said riser tube and a pocket in which air is entrapped upon rise in the surface level in said compartment to a position above the lower end of said baffle; an immersion tube communicating with said riser tube and extending downward in said receptacle, the lower end of said immersion tube being open to the atmosphere in said receptacle when the liquid level therein is below the lower end of this immersion tube; valve means for admitting additional solution to said container; and means for closing said valve means upon rise of said inverted cup to a predetermined position.

16. A combination as defined in claim 15, in which said last-named means and said valve means comprise an orificed seat member above said inverted cup and a valve member carried by said inverted cup to engage said seat member and close the orifice thereof.

17. An apparatus for proportioning a solution into a liquid in a receptacle as the liquid level therein rises, including in combination: a container positioned above said receptacle and providing a removable cover, said container retaining a body of said solution and providing an overflow means at a position above the normal surface level of said solution; a riser tube extending upward in said container to a position above said normal surface level; an inverted cup providing a skirt extending downward in said solution; an annular baffle extending downward in said inverted cup around the upper end of said riser tube, the lower end of said annular baffle being below said normal surface level, said annular baffle cooperating with said skirt in forming an annular air pocket for entrapping a body of air as the surface of said solution rises in said inverted cup; an immersion tube communicating with said riser tube and extending downward in said receptacle and providing an open lower end which opens on the atmosphere in said receptacle when the liquid level therein drops to a position below said open lower end; a valve seat member carried by said cover and providing an orifice through which additional solution can be supplied to said container; and a valve member carried by said inverted cup to engage said seat member and close said orifice upon rise of said inverted cup in said container.

18. In a solution-proportioning apparatus, the combination of: a container for retaining a body of said solution; a hollow float partially submerged in said body of solution and containing a portion of said solution in open communication with said body of solution in said container, said hollow float containing also a body of gas in pressure-transferring relationship with said portion of solution; means for increasing the pressure on said body of gas to displace solution from said hollow float into said body of solution in which said hollow float is partially submerged; and means for expelling from said container an amount of solution related to the amount of solution discharged from said hollow float by said increase in pressure.

19. In an apparatus for proportioning a solution into a receptacle, the combination of: a container for retaining a body of said solution; a hollow float partially submerged in said body of solution and containing a portion of said solution in open communication with said body of solution in said container, said hollow float containing also a body of gas in pressure-transferring relationship with said portion of solution; means for changing the pressure on said body of gas relative to the pressure in the space between said hollow float and said container to establish a pressure differential inside and outside said hollow float to exert thereon a vertical force and to relatively displace the solution inside and outside said hollow float to change the surface levels thereof; and means for expelling at least a portion of such displaced solution into said receptacle.

20. In an apparatus for proportioning a solution into a receptacle, the combination of: a container having an inner wall providing an overflow means; an element within said container, said element providing a main chamber therewithin and said element cooperating with said container in defining a discharge chamber between the periphery of said element and said inner wall of said container, said main and discharge chambers containing columns of said solution in communication at their lower ends; and means for displacing solution from said main chamber into said discharge chamber in response to an increase in the amount of liquid in said receptacle to discharge at least a portion of the displaced solution into said receptacle through said overflow means.

21. In an apparatus for proportioning a solution into a receptacle, the combination of: a container and a movable means therein providing a main chamber within said movable means and a discharge chamber exterior thereof, said container providing an overflow means communicating between said discharge chamber and said receptacle, said main and discharge chambers containing columns of said solution in communication at their lower ends; and means for changing the pressure in said main chamber provided by said movable means to displace solution therefrom into said discharge chamber and from said overflow means to said receptacle in response to an increase in the amount of liquid in said receptacle.

22. A combination as defined in claim 21, including means for guiding said movable means to move vertically within said container, and means for limiting the upward movement of said movable means with respect to said container.

23. A combination as defined in claim 21, in which said container provides an orifice above said movable means, and in which said movable means includes means for closing said orifice upon rise of said movable means in said container.

24. In an apparatus for proportioning a solution into a receptacle, the combination of: a container communicating at its upper end with the atmosphere and providing an overflow means, said container retaining a body of solution and said overflow means being positioned above the normal surface level of said solution; movable means providing a top wall and a side wall, said side wall dipping into said body of solution whereby said movable means contains a column of said solution; means for displacing solution from said movable means in response to an increase in the amount of liquid in said receptacle to raise the surface level of said solution in said container to said overflow means for discharge into said receptacle; and means responsive to movement of said movable means for admitting an additional amount of solution to said container.

25. In an apparatus for proportioning a solution into a receptacle as the liquid level in said receptacle rises, the combination of: a container providing an overflow means for discharging solution into said receptacle, said container retaining a body of solution having a normal surface level slightly below said overflow means; and means for raising said surface level to said overflow means and for displacing solution from said body of solution to overflow into said receptacle in response to an increase in the amount of liquid in said receptacle and at a rate which is higher initially than during the completion of the filling of said receptacle to insure substantial proportionality of solution and liquid when the liquid level in said receptacle is above a predetermined point, said means including an immersion tube extending downward in said receptacle and a bell at the lower end of said tube, said bell being open to the atmosphere in said receptacle when said receptacle is empty and being of larger internal diameter than said tube, the lower open end of said bell terminating a short distance above the bottom of said receptacle to be submerged by the rising liquid in said receptacle and to entrap air in said bell and said immersion tube as the receptacle liquid rises both in said receptacle and in said bell and tube, there being no overflow of said solution from said container into said receptacle during the time required for said liquid level to reach said lower open end of said bell nor during the time required for raising said surface level to said overflow means, said bell being of sufficiently larger internal diameter than said tube to entrap initially an excess amount of air sufficient to increase said initial rate of proportioning to compensate for said time required for submergence and said time required for raising said surface level to said overflow means while the receptacle liquid raises in said bell and before the receptacle liquid rises any substantial distance into said immersion tube.

26. A combination as defined in claim 21 in which said means for changing the pressure in said main chamber includes a normally-vertical immersion tube extending downward in said receptacle near a side wall thereof and providing an open lower end above the bottom of said receptacle to be open to the atmosphere in said receptacle when the level of said liquid is below said open lower end whereby a rise in said liquid level entraps air in said immersion tube and establishes an auxiliary surface of said liquid within said tube which rises therein as additional liquid is supplied to said receptacle, said immersion tube being formed at least in part of a section of flexible tubing formed of resilient material whereby said lower end can be manually moved sidewise away from said side wall of said receptacle, such sidewise movement flexing said section of tubing, said section returning said immersion tube to its normally vertical position when said lower end is released.

ARNOLD O. BECKMAN.

CERTIFICATE OF CORRECTION.

Patent No. 2,351,580. June 20, 1944.

ARNOLD O. BECKMAN.

It is hereby certified that error appears in the printed specification of the above numbered patent requiring correction as follows: Page 1, first column, line 15, for the word "utensiles" read --utensils--; page 9, first column, line 30, beginning with "25. In an" strike out all to and including "tube.", second column, line 25, comprising claim 25, and for the claim now appearing as number "26" read --25--; in the heading to the printed specification, line 8, for "26 Claims" read --25 Claims--; and that the said Letters Patent should be read with this correction therein that the same may conform to the record of the case in the Patent Office.

Signed and sealed this 5th day of September, A. D. 1944.

(Seal)

Leslie Frazer

Acting Commissioner of Patents.